United States Patent [19]

Sommer et al.

[11] 4,269,800

[45] May 26, 1981

[54] PROCESS FOR THE PREPARATION OF A COMPOSITE MAT CONSISTING OF A LAYER OF MINERAL WOOL AND A LAYER OF STEEL WOOL

[75] Inventors: Rolf Sommer, Darmstadt; Gustav Schweinfurth, Frankenthal; Heinz-Jurgen Ungerer, Virnheim, all of Fed. Rep. of Germany

[73] Assignee: Saint-Gobain Industries, France

[21] Appl. No.: 952,336

[22] Filed: Oct. 18, 1978

[30] Foreign Application Priority Data

Oct. 18, 1977 [DE] Fed. Rep. of Germany ....... 2746796

[51] Int. Cl.³ .............................................. B22F 3/24
[52] U.S. Cl. .................................... 264/111; 264/113; 264/122
[58] Field of Search ........................ 264/111, 122, 113

[56] References Cited

U.S. PATENT DOCUMENTS

| 3,061,888 | 11/1962 | Wadham | 264/111 |
| 3,081,207 | 3/1963 | Fox | 154/44 |
| 3,336,716 | 4/1967 | Scheppers | 264/44 |
| 3,811,976 | 5/1974 | Schlömer et al. | 264/111 |
| 3,923,945 | 12/1975 | Humphries | 264/122 |
| 3,923,946 | 12/1975 | Meyer | 264/111 |

FOREIGN PATENT DOCUMENTS 1070737 6/1967 United Kingdom .

Primary Examiner—Donald J. Arnold
Assistant Examiner—James R. Hall
Attorney, Agent, or Firm—John T. Synnestvedt; Kenneth P. Synnestvedt

[57] ABSTRACT

Technique for making exhaust muffler lining comprising mineral fibers with metal fibers distributed therein toward the inner surface of the lining, the metal fibers being bound by the fiber binder carried by the mineral fibers.

3 Claims, 1 Drawing Figure

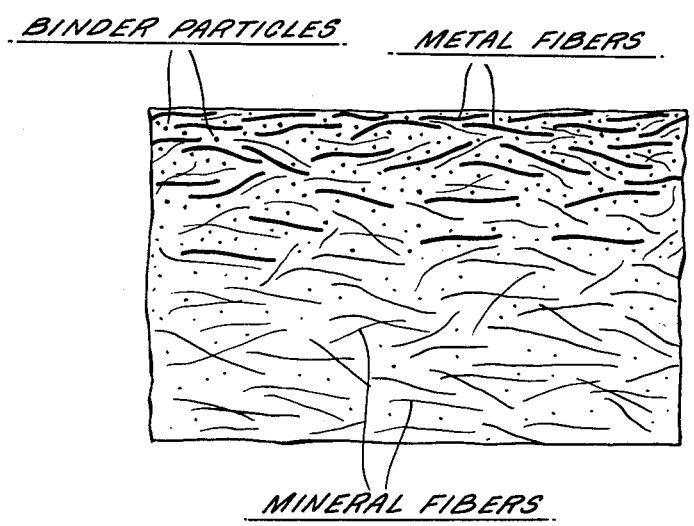

PROCESS FOR THE PREPARATION OF A COMPOSITE MAT CONSISTING OF A LAYER OF MINERAL WOOL AND A LAYER OF STEEL WOOL

The invention pertains to a process for producing a composite mat consisting of mineral fibers and metal fibers, preferably basalt wool and stainless steel wool, which is particularly suitable for use as a heat and corrosion resistant material for the sound-absorbing inserts or liners for mufflers on internal combustion engines.

Herein the term "mineral" is used to refer to various materials, both natural and synthetic, which are heat resistant and have relatively low thermal conductivity. Various types of rock, such as basalt, are examples of naturally occurring mineral materials; and various glass formulations are examples of synthetic mineral materials.

Heat and corrosion resistant inserts for mufflers have become known from German Utility Patent Application No. 72-23,051. Typically this involves a nonwoven web made of heat and corrosion resistant material, in which a layer of a mineral fiber is combined with a layer of a metal fiber. The connection between the layers has heretofore been produced in various ways, particularly where it is desired to produce an article in the form of a compressed piece. The two layers are needled together or quilted, or they are joined together by means of yarn or wire or combined by means of some adhesive. This assures that the metal fibers absorb the rough pulsation of the exhaust gas stream, and the mineral wool located behind the metal fibers is thus protected, so that the mineral wool fibers can no longer be broken or damaged in any other manner.

The joining of a mineral fiber layer and a metal fiber layer with yarn or wire first of all has the disadvantage that the necessary large stitching and sewing distances of the quilting stitches permit the production of only relatively large parts. In the case of small parts, the material webs break apart, because of the widely spaced quilting stitches.

Therefore in general a carrier material has heretofore been used for the quilting, which makes the manufacture of such mats more expensive. Therefore for reasons of cost, paper is frequently used, although this is combustible and must be rejected for safety reasons. In addition, if it is accidentally installed incorrectly in the muffler the paper prevents the sound absorption. Therefore, the muffler manufacturers frequently have this paper removed before installing the insulation, which once again increases the manufacturing cost.

It is also already known that molded articles of this type may be produced in which loose mineral fibers are arranged in a tube of metal fibers, fixed in this position by means of a paper jacket.

In this case also meaningful use is prevented by the combustibility of the paper. Furthermore a substantially higher fraction of metal fibers is necessary, since the metal fiber tube is relied upon to contribute to the stability of this molded article and therefore it must be constructed to possess sufficient strength.

If an adhesive is used to join the mineral fiber layer with the metal fiber layer, success cannot be expected, since the adhesive is decomposed by the temperatures prevailing in the muffler, as a result of which the layers will separate and thus the lining lose its cohesion.

The object of the present invention is to overcome the deficiencies of the prior art. Thus the invention provides a process for manufacturing a composite mat made of mineral fibers and metal fibers, preferably basalt wool and stainless steel wool, which is especially suitable for use as a heat and corrosion resistant material for the sound absorbing lining of mufflers in internal combustion engines, wherein due to cost considerations the subsequent coating of mineral fiber mats with metal fiber can be eliminated, the use of an additional adhesive is not necessary, and finally no stitching of the composite material need be performed. Nevertheless the composite mat in accordance with the invention will have adequate internal cohesion.

In accordance with the invention this goal is achieved by combining the metal fibers with the mineral fibers during or immediately after the mineral fibers are laid down upon the customary fiber collecting surface to form a mat. For this purpose the metal fibers are distributed or scattered over the mineral fiber mat being formed on the collecting surface.

In accordance with the invention, combining of the mineral fibers with the metal fibers is effected concurrently with the manufacture of the mineral fiber mat. It is possible, by introducing more or less large amounts of metal fibers, to achieve a corresponding intermixing of the metal fibers and mineral fibers.

The single FIGURE of the accompanying drawing schematically illustrates a mat prepared as contemplated by the present invention. The legends on the drawing identify the components.

The invention can be accomplished particularly advantageously if, as is preferred, the metal fibers are mixed with mineral fibers carrying fiber binders, preferably comprising not more than about 1% (by weight) of the mineral fibers. The application of such binders, for instance, resin binders, to mineral fiber mats is known per se.

It is known that pressure formed articles containing a maximum 1% binder are suited for use in mufflers, and that substantially smaller amounts of mineral fibers are needed in the case of these pressure formed articles. However, such pressure formed articles have the disadvantage that they must be subsequently machined and fitted to the contours of the muffler, which entails costs for this mechanical working as well as losses of material.

Binder carrying mineral fiber mats useable in the present invention, can be produced by spraying binder on the fibers as they are laid on a conventional conveyor belt below the fiber producing machine or machines. Such conveyor belt carries the mineral fiber mat produced in this manner through a drying tunnel, in which the desired thickness of the mineral fiber mat is established, and the binder, which is thermo-hardenable, is set by application of heat.

This known process is supplemented by the invention in that loose or fleece-like metal fibers are fed in above or below the mineral fiber mat before the mat is fed into the drying tunnel. Thus the metal fiber is combined with the mineral fiber mat before the binder is hardened. In the drying tunnel the two materials are held together and the binder is hardened. Thus a full surface bond is formed between the two materials. On the one hand the binder joins the mineral fibers together with the metal fibers in the mineral fiber mat, without requiring a separate addition of adhesive and also without the use of a discrete layer of adhesive. The sound absorbing ability of the mineral fiber layer is thus fully retained. In addition, the metal fibers intertwine with the mineral fibers during the deposition process, which increases the bonding of the two fiber types in the composite mat formed.

Even very small pieces may be cut out of a composite mat produced by the process in accordance with the invention without risk that the metal fibers and mineral fibers will separate. Because of the excellent mechanical properties of a composite mat of this type it is also possible, for example, to produce stamped out pieces, so that the production of small parts can be mechanized.

It has been found that composite mats, produced in accordance with the invention from mineral fibers and metal fibers, become less and less flexible with increasing thickness and density, and increasingly take on the character of a rigid panel. In another embodiment of the invention such rigidity can be reduced by introducing the binder into the mineral fiber mat in a manner providing for variations in the concentration of the binder from one side of the mat to the other depending on the density and thickness of the mat.

In this manner it is possible to produce composite mats made of mineral fibers and metal fibers up to about 60 mm in thickness and with a density of about 100 kg/m$^3$, with adequate flexibility.

The invention also contemplates equipment for producing such composite mats from mineral fibers and metal fibers. This is accomplished by using apparatus having at least one fiberizing device for producing and depositing the mineral fibers on a conveyor, spraying devices for applying a binder, and having a drying tunnel, through which the conveyor and the mineral fiber mat containing the binder pass. In accordance with the invention a feed device for metal fibers is provided in order to distribute the metal fibers on the fiber collecting surface or on the mat being formed, preferably between the fiberizing device and the drying tunnel, so that the metal fibers are applied above the mineral fiber mat.

If it is desired to produce a composite mat in accordance with the invention in which the binder concentration varies from one side of the mat to another, as a function of the thickness and density of the mineral fiber mat, then in a further embodiment of the invention a device is selected which has several fiberizing machines positioned successively, followed by the drying tunnel, and in which the binder nozzles are positioned below the fiberizing machine which serve to introduce the binder into the downwardly directed mineral fiber stream. In accordance with the invention the nozzles are then regulated to achieve the variation in the binder concentration as a function of the thickness and density of the mineral fiber mat, and/or such nozzles have different nozzle capacities.

Finally, the objective of the invention is also to provide a shaped article which is formed from a mat produced in accordance with the invention and which is advantageously used for lining exhaust pipe mufflers, especially for motor vehicles, wherein the lining is installed with the metal fibers presented inwardly to the interior of the exhaust carrying chamber.

We claim:

1. A process for making a composite fibrous mat incorporating a mixture of different types of fibers, comprising spraying a liquid thermo-hardenable binder on mineral fibers and forming the mat by scattering and depositing the mineral fibers onto a collecting surface, intertwining fleece-like metal fibers with the mineral fibers by distributing such metal fibers in the mineral fibers as the mineral fibers are being deposited to form the mat on the collecting surface, such distribution of the metal fibers in the mineral fibers being effected in at least one surface layer portion of the mat being formed, and heating the composite mat to harden the binder and thereby bond the mineral and metal fibers together.

2. A process in accordance with claim 1, in which the quantity of the binder applied to the mineral fibers is not more than 1% by weight of the mineral fibers.

3. A process in accordance with claim 1, in which the quantity of the metal fibers distributed in the mineral fibers being deposited on the collecting surface to form the mat is greater in one surface layer portion of the mat than in the other surface layer portion of the mat.

* * * * *